(12) United States Patent
Reiland et al.

(10) Patent No.: US 8,618,762 B2
(45) Date of Patent: Dec. 31, 2013

(54) SYSTEM AND METHOD FOR TENSIONING A ROBOTICALLY ACTUATED TENDON

(75) Inventors: Matthew J. Reiland, Oxford, MI (US); Myron A. Diftler, Houston, TX (US)

(73) Assignees: GM Global Technology Operations LLC, Detroit, MI (US); The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 526 days.

(21) Appl. No.: 13/014,901

(22) Filed: Jan. 27, 2011

(65) Prior Publication Data

US 2012/0194120 A1 Aug. 2, 2012

(51) Int. Cl.
*B25J 15/02* (2006.01)
*G05B 19/04* (2006.01)

(52) U.S. Cl.
USPC ............. 318/568.21; 318/568.2; 318/568.16; 700/245; 700/250; 700/260; 901/15; 901/23; 901/31; 901/38

(58) Field of Classification Search
USPC ............. 318/568.16, 568.21, 568.2; 700/245, 700/250, 260; 901/15, 23, 31, 38
See application file for complete search history.

(56) References Cited

U.S. PATENT DOCUMENTS

| 2009/0308188 A1 | 12/2009 | Yang et al. |
| 2010/0152898 A1 | 6/2010 | Reiland et al. |
| 2010/0259057 A1 | 10/2010 | Madhani |

FOREIGN PATENT DOCUMENTS

| DE | 60202408 T2 | 3/2006 |
| JP | 2003340771 A | 12/2003 |
| JP | 2009172735 A | 8/2009 |
| JP | 2011255467 A | 12/2011 |
| WO | 2010018358 A2 | 2/2010 |

*Primary Examiner* — Erick Glass
(74) *Attorney, Agent, or Firm* — Quinn Law Group, PLLC

(57) ABSTRACT

A tendon tensioning system includes a tendon having a proximal end and a distal end, an actuator, and a motor controller. The actuator may include a drive screw and a motor, and may be coupled with the proximal end of the tendon and configured to apply a tension through the tendon in response to an electrical current. The motor controller may be electrically coupled with the actuator, and configured to provide an electrical current having a first amplitude to the actuator until a stall tension is achieved through the tendon; provide a pulse current to the actuator following the achievement of the stall tension, where the amplitude of the pulse current is greater than the first amplitude, and return the motor to a steady state holding current following the conclusion of the pulse current.

20 Claims, 5 Drawing Sheets

SYSTEM AND METHOD FOR TENSIONING A ROBOTICALLY ACTUATED TENDON

STATEMENT REGARDING FEDERALLY SPONSORED RESEARCH OR DEVELOPMENT

This invention was made with government support under NASA Space Act Agreement number SAA-AT-07-003. The invention described herein may be manufactured and used by or for the U.S. Government for U.S. Government (i.e., non-commercial) purposes without the payment of royalties thereon or therefore.

TECHNICAL FIELD

The present invention relates generally to systems and methods for maintaining tension on a robotically actuated tendon.

BACKGROUND

Robots are automated devices that may be capable of manipulating objects using a series of links. The links are interconnected by one or more actuator-driven robotic joints. Each joint in a typical robot represents at least one independent control variable, or a degree of freedom. End-effectors are the particular manipulators used to perform a task at hand, such as grasping a work tool. Therefore, precise motion control of the various robotic manipulators helps to achieve the required mobility, dexterity, and work task-related functionality.

Dexterous robots may be used where a direct interaction is required with devices or systems specifically designed for human use, i.e., devices requiring human-like levels of dexterity to properly manipulate. The use of dexterous robots may also be preferred where a direct interaction is required with human operators, as the motion of the robot can be programmed to approximate human motion. Such robots may include a plurality of fingers that can be actuated remotely using tendons, thus reducing the overall size and weight of the robot. Such tendons must be kept taut at all times to within a calibrated tension level, however, to actuate a finger, the tendon must be transitioned to a higher tension level. To maintain, for example, a gripping force using the finger, the tendon must remain at the higher tension level until commanded to relax.

SUMMARY

A tendon tensioning system includes a tendon having a proximal end and a distal end, an actuator, and a motor controller. The actuator may include a drive screw and a motor, and may be coupled with the proximal end of the tendon and configured to apply a tension through the tendon in response to an electrical current.

The motor controller may be electrically coupled with the actuator and may be configured to provide an electrical current with a first amplitude to the actuator until a stall tension is achieved through the tendon. The controller may then provide a pulse current to the actuator following the stall, where the amplitude of the pulse current is greater than the first amplitude, and subsequently return the motor to a steady state holding current following the conclusion of the pulse current. In an embodiment, the motor controller may be configured to allow the tension maintained in the tendon to dwell at the stall tension for a period of time before providing the pulse current to the actuator.

The holding current provided to the actuator may have an amplitude less than a maximum steady state current level of the system, and the amplitude of the pulse current may be less than a maximum instantaneous current level of the system. Additionally, the pulse current provided to the actuator may be operative to increase the tension provided through the tendon to a boosted tension level, where the boosted tension level being greater than the stall tension. The actuator may then be configured to maintain the boosted tension level through the tendon following the conclusion of the pulse current.

In one configuration, the distal end of the tendon may be coupled with a finger of a dexterous robot. As such, the actuator may be a finger actuator. Additionally, the drive screw of the actuator may include a ball screw, with a ball nut disposed about the ball screw and coupled with the tendon. The actuator may be configured to maintain at least a minimal tension on the tendon at all times during operation, the minimal tension being less than the stall tension.

A method for controlling an actuator to tension a tendon may include providing a tendon and an actuator, where the actuator is configured to apply a tension through the tendon in response to an electrical current. The tendon may have a proximal end and a distal end, where the proximal end of the tendon is coupled to the actuator. The method may further include driving the actuator through an initial electrical current that has a first amplitude until a stall tension is achieved through the tendon, delivering a pulse current to the actuator following the stall, with the amplitude of the pulse current being greater than the first amplitude, and returning the electrical current delivered to the motor to a steady state holding amplitude following the conclusion of the pulse current.

The above features and advantages and other features and advantages of the present invention are readily apparent from the following detailed description of the best modes for carrying out the invention when taken in connection with the accompanying drawings.

DETAILED DESCRIPTION

Figure 1:
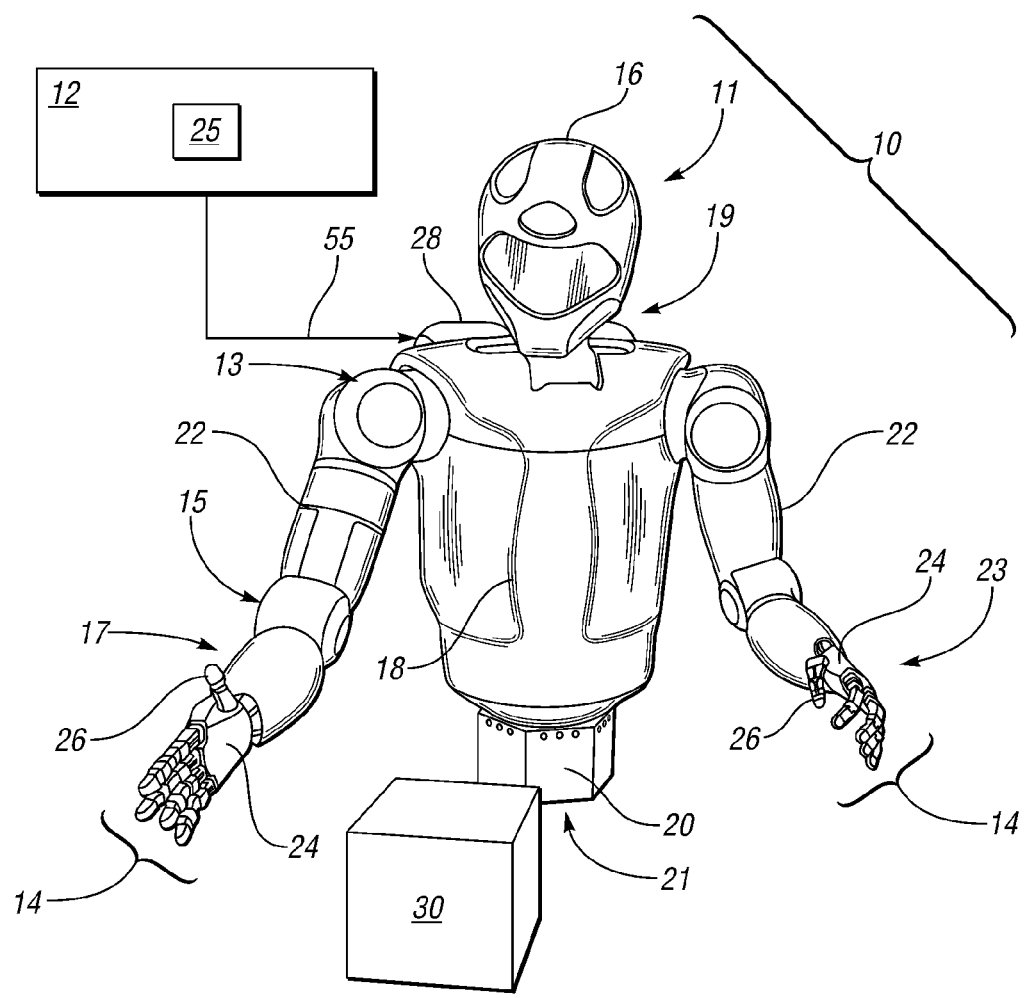
FIG. 1 is a schematic illustration of a robotic system having a robot with tendon-driven fingers that may be actuated as set forth herein.

With reference to the drawings, wherein like reference numbers refer to the same or similar components throughout the several views, and beginning with FIG. 1, a robotic system 10 is shown that includes a dexterous robot 11 and a controller 12. The robot 11 may include various manipulators, including a plurality of tendon-driven fingers 14. The controller 12 may be embodied as a processor and/or related hardware devices, or alternatively as nested software-based control loops that are resident in a single or in a distributed hardware device and automatically executed by one or more processors. Furthermore, the controller 12 may include or embody a control system 25 that may perform one or more control routines.

Figure 3:
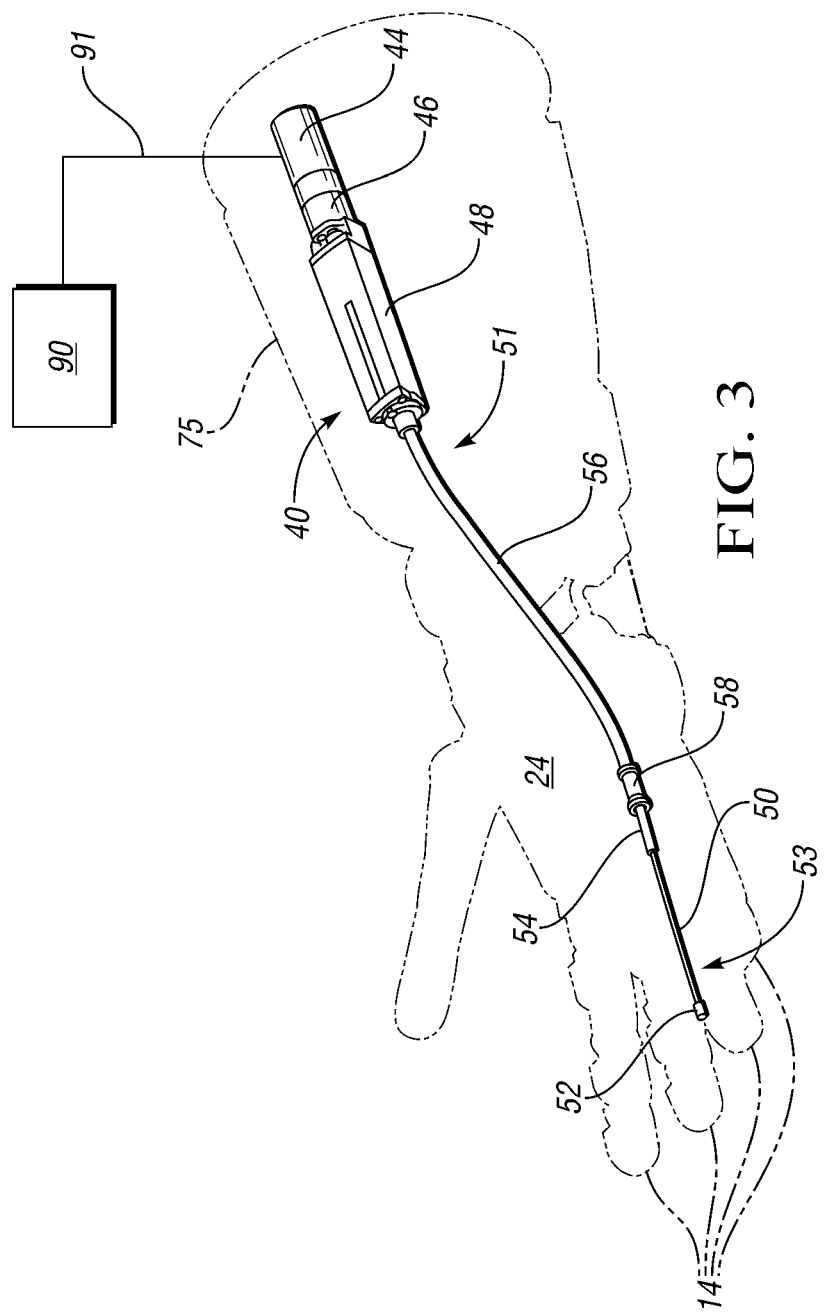
FIG. 3 is a schematic perspective view of a tendon and actuator assembly for use in controlling dexterous robotic fingers.

To manipulate the fingers 14 of the dexterous robot 11, such as when grasping an object 30, the controller 12 may be operative to vary the tension applied through one or more tendons 50, such as schematically shown in FIG. 3. The control system 25 may employ, for example and without limitation, force-based control and/or a position-based control to regulate the tension maintained within a tendon. Such control may further include closed-loop force and/or position feedback to refine the controllability. Within the control system 25, the particular control law being applied, i.e., force or position, may be selected in a manner that depends upon the number of available tension sensors for a given finger 14.

In one embodiment, the robot 11 shown in FIG. 1 may be configured with a human-like appearance, and with human-like levels of dexterity to the extent necessary for completing a given work task. Humanoids and other dexterous robots can be used where a direct interaction is required with devices or systems specifically designed for human use, for example any devices requiring human-like levels of dexterity to properly manipulate an object 30. The use of a humanoid such as the robot 11 depicted in FIG. 1 may be preferred where a direct interaction is required between the robot and human operators, as motion of the robot can be programmed to closely approximate human motion. The fingers 14 of robot 11 may be directly controlled by hardware components of the controller 12, e.g., a host machine, server, or network of such devices, via a set of control signals 55 during the execution of any maneuver or work task in which the robot acts on the object 30.

The robot 11 shown in FIG. 1 may be programmed to perform automated tasks with multiple degrees of freedom (DOF), and to perform other interactive tasks or to control other integrated system components, e.g., clamping, lighting, relays, etc. According to one possible embodiment, the robot 11 may have a plurality of independently- and interdependently-moveable actuator-driven robotic joints, some of which have overlapping ranges of motion. In addition to the various joints 23 of the fingers 14, which separate and move the various phalanges thereof, the robotic joints of robot 11 may include a shoulder joint, the position of which is generally indicated in FIG. 1 by arrow 13, an elbow joint (arrow 15), a wrist joint (arrow 17), a neck joint (arrow 19), and a waist joint (arrow 21).

Still referring to FIG. 1, each robotic joint may have one or more DOF. For example, certain compliant joints such as the shoulder joint (arrow 13) and the elbow joint (arrow 15) may have at least two DOF in the form of pitch and roll. Likewise, the neck joint (arrow 19) may have at least three DOF, while the waist and wrist (arrows 21 and 17, respectively) may have one or more DOF. Depending on task complexity, the robot 11 may move with over 42 DOF. Each robotic joint contains and is internally driven by one or more actuators, for example joint motors, linear actuators, rotary actuators, and the like.

Figure 2:
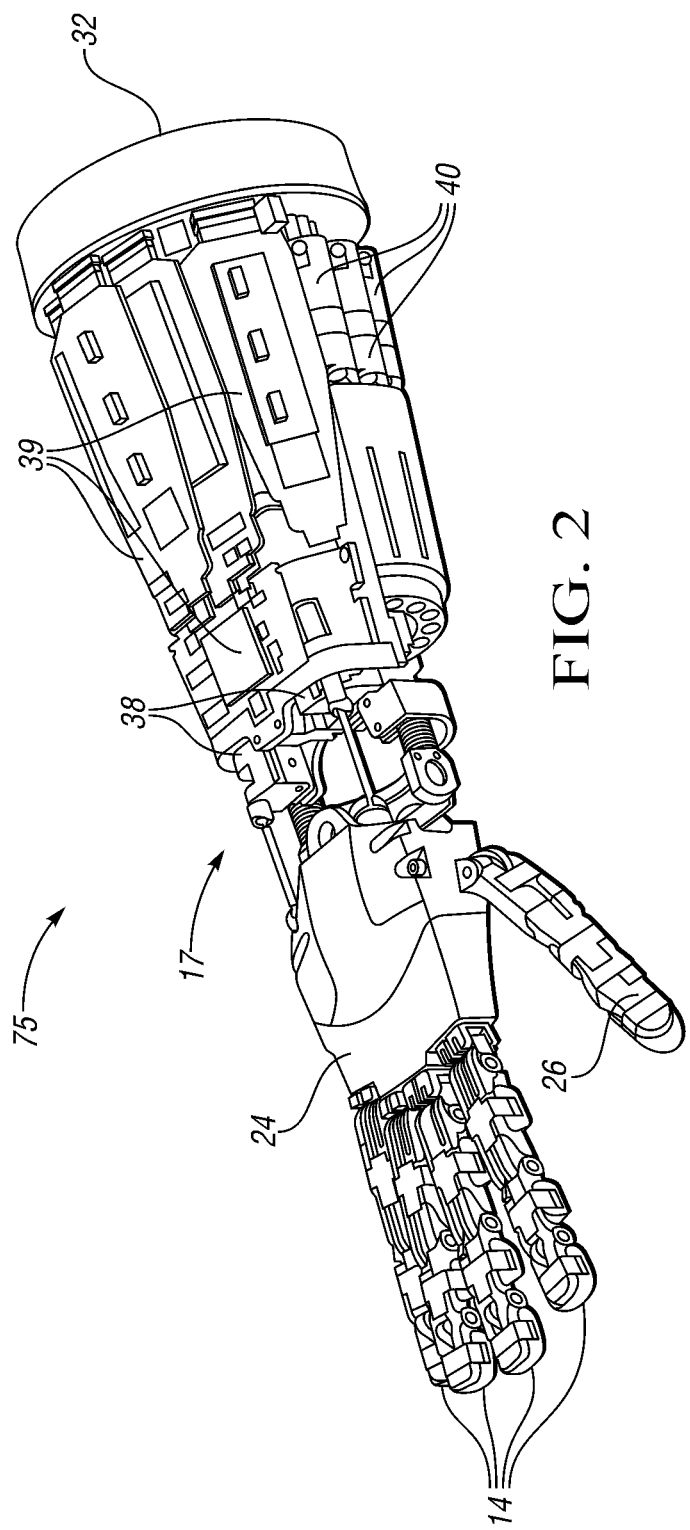
FIG. 2 is a schematic perspective view of a lower arm assembly for the robot shown in FIG. 1, the arm assembly including a plurality of tendon-driven robotic fingers.

In one embodiment, the robot 11 may include just the lower arm assembly 75 shown in FIG. 2. In another embodiment, the robot 11 may include additional human-like components such as a head 16, a torso 18, a waist 20, arms 22, hands 24, fingers 14, and opposable thumbs 26, with the various joints noted above being disposed within or between these components. As with a human, both arms 22 and other components may have ranges of motion that overlap to some extent. The robot 11 may also include a task-suitable fixture or base (not shown) such as legs, treads, or another moveable or fixed base depending on the particular application or intended use of the robot. A power supply 28 may be integrally mounted to the robot 11, e.g., a rechargeable battery pack carried or worn on the back of the torso 18 or another suitable energy supply, or which may be attached remotely through a tethering cable, to provide sufficient electrical energy to the various joints for movement of the same.

The controller 12 may be embodied, as noted above, as a server or a host machine, i.e., one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, and any required input/output (I/O) circuitry and devices, as well as signal conditioning and buffering electronics.

While shown as a single device in FIG. 1 for simplicity and clarity the various elements of control system 12 may be distributed over as many different hardware and software components as are required to optimally control the robot 11. The individual control routines/systems 25 resident in the controller 12 or readily accessible thereby may be stored in ROM or other suitable tangible memory location and/or memory device, and automatically executed by associated hardware components of the control system to provide the respective control functionality.

Referring to FIG. 2, a lower arm assembly 75 can be used as part of the robot 11 shown in FIG. 1. Each lower arm assembly 75 may include a hand 24 having a plurality of tendon-driven fingers 14 and a tendon-driven thumb 26. The term "tendon-driven" is explained below with reference to FIG. 3. The lower arm assembly 75 may include a plurality of finger actuators 40 that each may be respectively configured to selectively pull on, and release one or more tendons 50 (see FIG. 3) in a finger 14 or in a thumb 26. The lower arm assembly 75 may further include a plurality of wrist actuators 38 for moving the wrist joint (arrow 17). Printed circuit board assemblies (PCBA) 39 for the finger actuators 40 and/or the wrist actuators 38 may be positioned on or within the lower arm assembly 75 as shown for packing efficiency. The lower arm assembly 75 may be attached to a load cell 32, which is used to connect the lower arm assembly to the rest of the arm 22 of the robot 11 shown in FIG. 1.

Multiple finger actuators 40 may correspond to each finger 14 and thumb 26. In general, one finger actuator 40 may be used for each DOF available plus one additional finger actuator. Therefore, each finger 14 having three DOF requires four finger actuators 40, while each finger having two DOF requires three finger actuators, etc.

Referring to FIG. 3, a schematic perspective view is provided of a possible embodiment of the finger actuator 40. As shown, the finger actuator 40 may be provided with a tendon 50 having a proximal end 51 and a distal end 53, where the finger actuator 40 may be coupled with the proximal end 51 of the tendon 50. Additionally, a tendon terminator 52 may be coupled to the distal end 53 of the tendon 50, which may be operative to couple the tendon 50 to a finger 14 of the dexterous robot 11. The finger actuator 40 may include a motor 44, a gear drive 46, and a linear actuator 48, which may cooperate to apply a tension through the tendon 50 in response to an electrical current. The tendon 50 is illustrated in an off-center position within the finger 14, as more than one tendon may extend within a given finger. The motor 44, gear drive 46, and linear actuator 48 may all be located in the lower arm assembly 75 in order to minimize the packaging space required within the fingers 14 and the thumb 26, and to allow for the larger components of the finger actuator 40, such as the linear actuator 48, to be remotely packaged with respect to the fingers and thumb.

The tendon 50 may be protected by a sheath or conduit liner 54 positioned within a protective outer conduit 56. The tension sensor 58 measures the force of compression on the conduit 56 to determine the amount of tension placed on the tendon 50. Tension in the tendons 50 can be used by the controller 12 shown in FIG. 1 to calculate the joint torques generated or experienced at the various joints of a given finger 14, which in turn can be used by a motor controller 90 to control the actuation of the fingers and thumbs 26 of a given hand 24.

As the finger actuator 40 moves the tendon 50, the tendon 50 slides relative to the tension sensor 58. The tendon 50 terminates within the finger 14 at the tendon terminator 52. Movement of the tendon 50 may cause a relative movement of the tendon terminator 52, which, as described above, may be affixed to a portion of a finger 14. Force may be placed on the tendon terminator 52 either internally, i.e., by movement of the finger actuator 40, or externally, i.e., on the finger 14 by the object 30 of FIG. 1, which causes the tendon 50 to exert force on the linear actuator 48.

Figure 4:
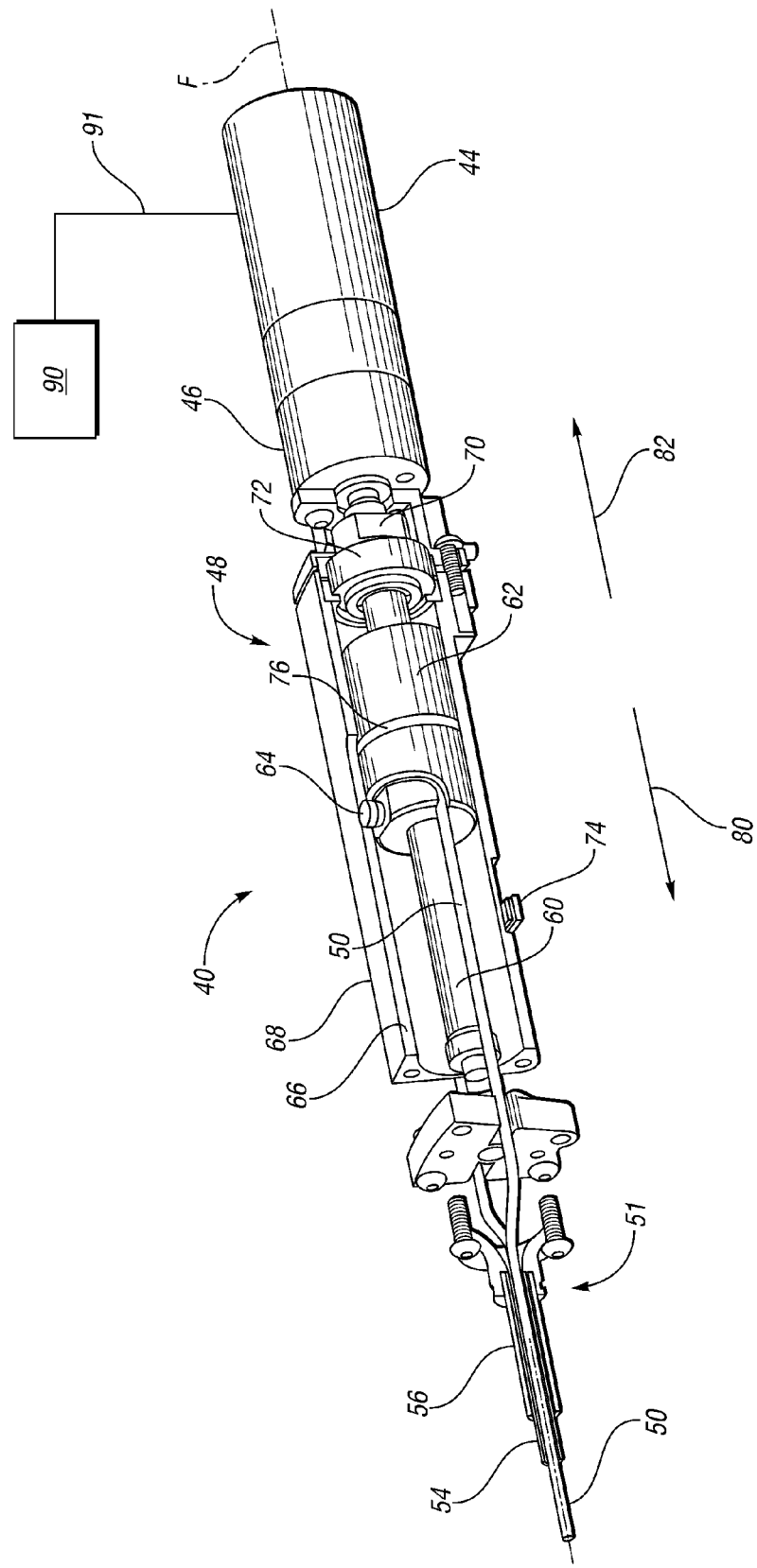
FIG. 4 is a schematic perspective partially cross-sectional view of a tendon and actuator assembly, such as illustrated in FIG. 3.

FIG. 4 is a perspective, partially cross-sectional illustration of a finger actuator assembly 40, such as provided in FIG. 3. As shown, a motor 44 is powered to drive a gear drive 46 which, may in-turn cause rotation of a ball screw 60. A ball nut 62 may be disposed about and/or have a threaded engagement with the ball screw 60, and a guide pin 64 may extend from the ball nut 62 and prevents rotation of the ball nut 62 in response to movement of the ball screw 60. In other embodiments, other linear actuator technology may be employed, such as for example, roller screws or backdriveable lead screws. In an embodiment, the guide pin 64 may extend at least partially through a slot 66 defined by the housing 68 of the linear actuator 48. The interference between the guide pin 64 and the linear actuator housing 68 can serve to restrain any rotational movement of the guide pin 64, and thus the ball nut 62. Therefore, as the gear drive 46 rotates the ball screw 60, the ball nut 62 may translate axially along the ball screw 60. The motor 44, gear drive 46 and ball screw 60 define a finger actuator axis F along which the ball nut 62 may be configured to travel.

The gear drive 46 may be connected to the ball screw 60 via a coupling 70, which may allow the coupling 70 to transmit the torque of the gear drive 46 while minimizing transmission of any axial load. Additionally, a bearing 72 may be located between the coupling 70 and the ball screw 60 to reduce friction between the actuator housing 68 and the ball screw 60 and to carry the axial load transmitted from the tendon 50 to the ball screw 60.

A position sensor 74 may be mounted to the finger actuator housing 68 to sense an axial position of the ball nut 62 along the ball screw 60. As shown, the position sensor 74 may include Hall Effect sensor, with a magnet 76 attached to the ball nut 62. Alternatively, the position sensor 74 may include a linear encoder or employ other continuous or discrete forms of position sensing.

The tendon 50 may be attached to the ball nut 62 in a suitable manner so that movement of the ball nut 62 may cause a corresponding movement of the tendon 50. The movement of the tendon 50 may either straighten or bend the finger 14, depending on which side of the finger 14 the tendon is disposed on. An additional finger actuator 40 may be utilized to perform the opposing straightening or bending motion. Therefore, each finger 14 (shown in FIG. 3) may have at least one finger actuator 40 for each degree of freedom. In general each finger 14 may have one actuator per degree of freedom plus one additional actuator. For example, a three DOF finger may have four actuators and a four DOF finger has five actuators.

Each finger actuator 40 may be controlled by a respective motor controller 90 that may be electrically coupled with the motor 44. Multiple motor controllers 90 may be included within a broader controller (e.g., controller 12 shown in FIG. 1), or may be separate from each other. A motor controller 90 may be configured to either directly provide a motor 44 with an operating current 91, or it may merely provide a higher level command that may otherwise control the flow of current through the motor. For example, in an embodiment, the motor controller 90 may provide the motor with a digital value between 0 and 255, which may, in turn, be translated by the motor 44 into a current or torque.

During operation, a minimal tension may be maintained by each tendon 50 and/or provided by each respective finger actuator 40 at all times. Because each tendon 50 is desirably only configured to pull, the minimal tension may allow a finger actuator 40 to be maintained in a "ready" state without any slack developing in the tendon 50. Movement of the ball nut 62 in a distal direction 80 along axis F may lessen the tension applied through the tendon 50; and conversely, movement of the ball nut 62 in a proximal direction 82 may increase the tension applied through the tendon 50. To increase the speed at which the nut 62 may travel along axis F, and thus the response speed of the finger actuator 40, the finger actuator 40 may have a relatively low gear ratio in the gear drive 46 and/or a low ratio in the ball screw 60. In an embodiment, the gear ratio may be, for example and without limitation, approximately 14:1, however other gear ratios may similarly be used. The tradeoff with a lower torque reduction in the actuator 40, however, is an increased likelihood that the tension maintained through the tendon 50 will back drive the ball nut 62 along the ball screw 60. This contrasts with higher gear ratio systems that may have system dynamics inherently more difficult to back drive. To provide a system that can maintain a high tension through the tendon 50, yet reduce the likelihood of the ball nut 62 back-driving along the ball screw 60, the motor 44 may be configured to augment the system dynamics of the gear drive 46 and ball screw 60.

Figure 5:
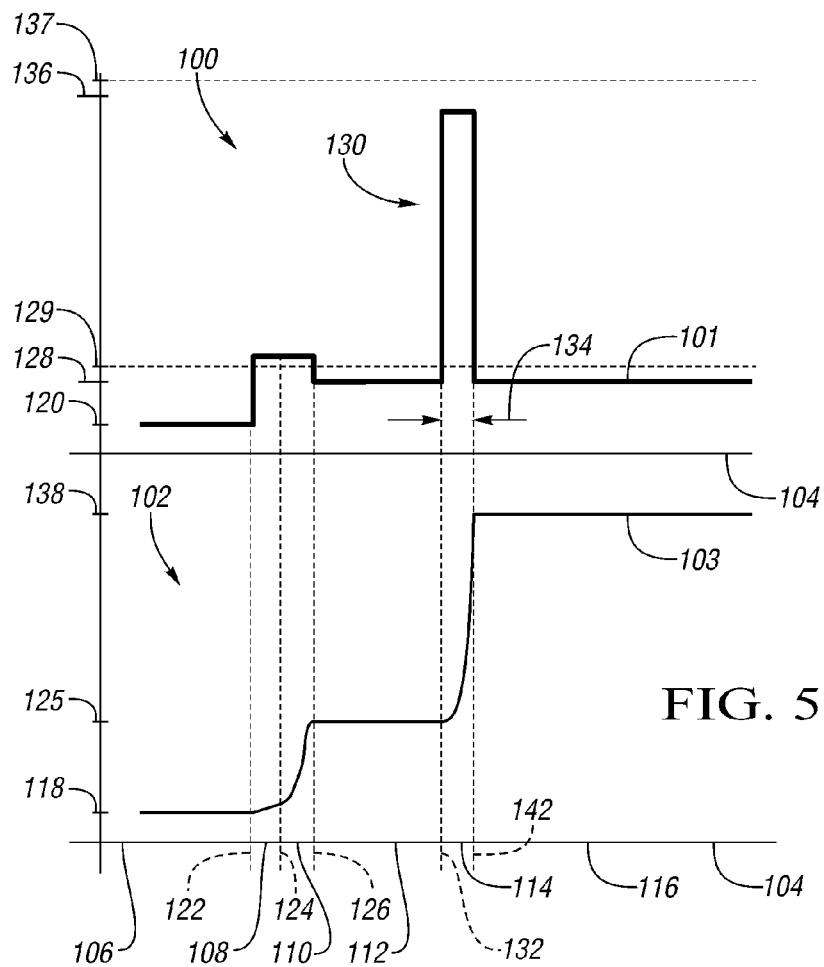
FIG. 5 is a schematic graph of a motor current provided to a tendon actuator, along with a corresponding tendon tension over the duration of a grasping routine.

FIG. 5 illustrates a current plot 100 and tension plot 102 that may be exhibited by a finger actuator 40 over the duration of a grasping routine (i.e., where the current plot 100 illustrates the current 101 provided to the motor 44 as a function of time 104, and the tension plot 102 illustrates the tension 103 provided through a tendon 50 as a function of time 104). As shown, the grasping procedure may be divided into, for example, six distinct periods (i.e., periods 106, 108, 110, 112, 114, and 116) that each may describe a different actuator 40 and/or controller 90 behavior within the procedure. These periods are meant to be purely illustrative, however, and should not be construed to limit the invention.

Within the first period 106, the finger actuator 40 may be maintained in a "ready" state with a minimal tension 118 maintained through the tendon 50. This minimal tension 118 may be generated, in part, by a minimal current 120 passing through the motor 44. Upon being provided with an actuation command at time 122, the current 101 may increase, which may cause the finger 14 to accelerate towards an object 30. While the finger 14 is moving, the tension 103 through the tendon 50 may gradually increase, as shown in period 108.

At time 124, the finger 14 may engage the object 30, wherein the tension 103 in the tendon 50 may quickly increase to a steady state level 125 (i.e., the stall tension 125). The ramp-up in tension 103 can be seen in period 110 of the tension plot 102. At time 124, the tension 103 may become discontinuous due to the external influence of the object 30 on the finger 14. Depending on the compliance of the object 30, the tension 103 through the tendon 50 may increase at a varying rate. Inevitably, however, the object 30 that is being grasped will provide enough resistance to cause the motor 44 to stall, thus providing no further increase in tension (i.e., time 126). Once this occurs, the motor controller 90 may be configured to reduce the current 101 provided to the motor 44 down to a lower current level 128, also referred to as the steady-state holding current 128. In an embodiment, the steady state holding current 128 may be at or slightly below a maximum steady state current level 129. Such a maximum level may represent the greatest amount of current that the motor 44 and/or controller 90 can operationally maintain over an indefinite period of time.

Once a stall tension 125 is reached, the controller 90 may provide a pulse current 130 to the motor 44, as shown in period 114, and initiated at time 132. The pulse current 130 may have a relatively short duration 134, though, may have a relatively high amplitude 136 (as compared with the holding current 128). In an embodiment, the duration 134 of the pulse current 130 may be, for example and without limitation, approximately 10-50 milliseconds. Additionally, the amplitude 136 of the pulse current 130 may be at or slightly less than a maximum allowable instantaneous current 137 that may be provided by the controller 90, or received by the motor 44. In embodiment, as shown in FIG. 5, the system may dwell at the stall tension 125 for a period of time 112. In another embodiment, the system need not dwell at the interim stall tension 125 for any prolonged period of time before providing the pulse current 130. As such, the duration of period 112 may be reduced down to a single instance.

The pulse current 130 may cause the tension 103 in the tendon 50 to increase from the lower, stall tension 125 to a higher tension level 138 by forcibly driving the motor 44 with the high-amplitude surge. Once the pulse 130 falls back to the holding current 128 at time 142, the higher tension level 138 may be maintained within the tendon 50 and finger actuator 40, as shown in the tension plot 102 within period 116. In an embodiment, the ability to maintain a higher tension at a lower current may be attributed, in part to frictional dynamics of the ball screw 60 and/or gear drive 46, and, in part to the holding current 128 applied to the motor 44. As such, the holding current 128 may augment the frictional dynamics of the finger actuator 40 to discourage the motor 44 from being back driven. Allowing the reduction to the lower holding current may provide a considerable power savings as compared to relying solely on the motor to maintain a high holding torque/tension.

Figure 6:
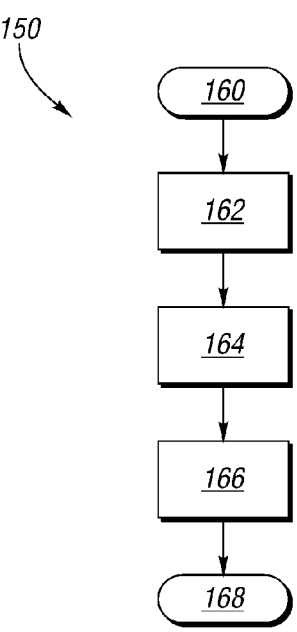
FIG. 6 is a flow diagram of a method for tensioning a robotically actuated tendon.

FIG. 6 illustrates a method 150 of tensioning a robotically actuated finger-tendon 50 during a grasping routine. As shown upon being provided with a grasping command at 160, the finger actuator motor 44 may be driven by a first current that may cause the finger to move into contact with an object 30 (Step 162). As described above with respect to FIG. 5, upon contact, the tension 103 provided through the tendon 50 may increase until the forces generated by the motor 44 are balanced by the reactionary forces of the object 30, at which time the motor 44 may stall. Once the stall is detected, a "tension boost" command may be provided at Step 164. The tension boost command may cause the controller 90 to provide a pulse current 130 to the motor 44. The pulse current 130 may forcibly cause the motor 44 to impart a much higher tension on the tendon 50 than was initially maintained at the equilibrium state in Step 162.

Following the delivery of the pulse current 130 in Step 164, the current level provided to the motor 44 may fall back down to the initial stall current 128 reached in Step 166. This current 128, together with the frictional dynamics of the finger actuator 40, may cause the boosted tension (imparted via the current pulse) to be maintained through the tendon 50. Step 168 concludes the routine with a high tension 138 being maintained by a low current command.

While the best modes for carrying out the invention have been described in detail, those familiar with the art to which this invention relates will recognize various alternative designs and embodiments for practicing the invention within the scope of the appended claims. All directional references (e.g., upper, lower, upward, downward, left, right, leftward, rightward, above, below, vertical, and horizontal) are only used for identification purposes to aid the reader's understanding of the present invention, and do not create limitations, particularly as to the position, orientation, or use of the invention. It is intended that all matter contained in the above description or shown in the accompanying drawings shall be interpreted as illustrative only and not as limiting.

The invention claimed is:

1. A tendon tensioning system comprising:
   a tendon having a proximal end and a distal end;
   an actuator coupled with the proximal end of the tendon and configured to apply a tension through the tendon in response to an electrical current, the actuator including a drive screw and a motor; and
   a motor controller electrically coupled with the actuator, the motor controller configured to:
   provide an electrical current having a first amplitude to the actuator until a stall tension is achieved through the tendon;
   provide a pulse current to the actuator following the achievement of the stall tension, the amplitude of the pulse current being greater than the first amplitude; and
   return the motor to a steady state holding current following the conclusion of the pulse current.

2. The system of claim 1, wherein the distal end of the tendon is coupled with a finger of a dexterous robot.

3. The system of claim 1, wherein the drive screw is a ball screw, the actuator further including a ball nut disposed about the ball screw and coupled with the tendon.

4. The system of claim 1, wherein the motor controller is configured to allow the tension maintained in the tendon to dwell at the stall tension for a period of time before providing the pulse current to the actuator.

5. The system of claim 1, wherein the holding current has an amplitude less than a maximum steady state current level of the system, and wherein the amplitude of the pulse current is less than a maximum instantaneous current level of the system.

6. The system of claim 1, wherein the pulse current provided to the actuator is operative to increase the tension provided through the tendon to a boosted tension level, the boosted tension level being greater than the stall tension.

7. The system of claim 6, wherein the actuator is configured to maintain the boosted tension level through the tendon following the conclusion of the pulse current.

8. The system of claim 1, wherein the actuator configured to maintain at least a minimal tension on the tendon at all times during operation, the minimal tension being less than the stall tension.

9. A system for providing an increased grasping force through a finger of a dexterous robot during a grasping routine, the system comprising:
- a tendon having a proximal end and a distal end and extending along a length of a finger of a dexterous robot, the distal end of the tendon being coupled to the finger;
- a finger actuator including a drive screw and a motor and located in a lower arm assembly of the dexterous robot and apart from the finger, the finger actuator coupled with the proximal end of the tendon and configured to apply a tension through the tendon in response to an electrical current; and
- a motor controller electrically coupled with the finger actuator, the motor controller configured to:
  - provide an electrical current having a first amplitude to the finger actuator until a stall tension is achieved through the tendon;
  - provide a pulse current to the actuator following the achievement of the stall tension, the amplitude of the pulse current being greater than the first amplitude; and
  - return the motor to a steady state holding current following the conclusion of the pulse current.

10. The system of claim 9, wherein the drive screw is a ball screw, the actuator further including a ball nut disposed about the ball screw and coupled with the tendon.

11. The system of claim 9, wherein the motor controller is configured to allow the tension maintained in the tendon to dwell at the stall tension for a period of time before providing the pulse current to the actuator.

12. The system of claim 9, wherein the holding current has an amplitude less than a maximum steady state current level of the system, and wherein the amplitude of the pulse current is less than a maximum instantaneous current level of the system.

13. The system of claim 9, wherein the pulse current provided to the actuator is operative to increase the tension provided through the tendon to a boosted tension level, the boosted tension level being greater than the stall tension.

14. The system of claim 13, wherein the actuator is configured to maintain the boosted tension level through the tendon following the conclusion of the pulse current.

15. A method for controlling an actuator to tension a tendon, the method comprising:
- providing a tendon having a proximal end and a distal end;
- providing an actuator coupled with the proximal end of the tendon and configured to apply a tension through the tendon in response to an electrical current, the actuator including a drive screw and a motor;
- driving the actuator with an electrical current having a first amplitude until a stall tension is achieved through the tendon;
- delivering a pulse current to the actuator following the achievement of the stall tension, the amplitude of the pulse current being greater than the first amplitude; and
- returning the electrical current delivered to the motor to a steady state holding amplitude following the conclusion of the pulse current.

16. The method of claim 15, wherein the pulse current provided to the actuator is operative to increase the tension provided through the tendon to a boosted tension level, the boosted tension level being greater than the stall tension.

17. The method of claim 15, further comprising:
- providing a dexterous robot having a plurality of fingers; and
- wherein the distal end of the tendon is coupled with a finger of a dexterous robot.

18. The method of claim 17, wherein the dexterous robot includes forty two degrees of freedom.

19. The method of claim 17, wherein the electrical current causes the actuator to apply a force to the finger.

20. The method of claim 15, wherein the electrical current at the steady state holding amplitude discourages the motor from back driving.

* * * * *